(12) United States Patent
Bour et al.

(10) Patent No.: US 10,807,194 B2
(45) Date of Patent: Oct. 20, 2020

(54) DEVICE FOR FABRICATING ANNULAR PIECES BY SELECTIVELY MELTING POWDER, THE DEVICE INCLUDING A POWDER WIPER

(71) Applicant: SAFRAN AIRCRAFT ENGINES, Paris (FR)

(72) Inventors: Jean-Luc Denis Bour, Poitiers (FR); Olivier Pascal Paul Chantoiseau, Livry sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 383 days.

(21) Appl. No.: 15/717,057

(22) Filed: Sep. 27, 2017

(65) Prior Publication Data

US 2018/0085856 A1 Mar. 29, 2018

(30) Foreign Application Priority Data

Sep. 29, 2016 (FR) ..................... 16 59327

(51) Int. Cl.
*B23K 26/34* (2014.01)
*B22F 3/105* (2006.01)
(Continued)

(52) U.S. Cl.
CPC ............ *B23K 26/34* (2013.01); *B22F 3/1055* (2013.01); *B23K 26/144* (2015.10); *B23K 26/702* (2015.10); *B29C 64/153* (2017.08); *B29C 64/214* (2017.08); *B29C 64/241* (2017.08); *B33Y 30/00* (2014.12); *B33Y 80/00* (2014.12);
(Continued)

(58) Field of Classification Search
CPC ......... B33Y 30/00; B33Y 10/00; B33Y 40/00; B33Y 70/00; B33Y 50/02; B33Y 80/00

USPC ......... 219/76.1, 76.14, 76.12, 76.16, 121.65, 219/121.64, 121.77, 121.12, 121.14, 219/121.16, 121.17, 121.61, 121.62, 219/121.63, 121.76, 121.82, 121.83, 219/121.85

See application file for complete search history.

(56) References Cited

U.S. PATENT DOCUMENTS

2002/0195747 A1 12/2002 Hull et al.
2004/0265413 A1 12/2004 Russell et al.
(Continued)

FOREIGN PATENT DOCUMENTS

DE 10 2013 210 2 12/2014
EP 1 270 185 A1 1/2003

OTHER PUBLICATIONS

French Preliminary Search Report dated Jun. 27, 2017 in French Application 16 59327 filed on Sep. 29, 2016 (with English Translation of Categories of Cited Documents).

*Primary Examiner* — Serkan Akar
*Assistant Examiner* — Chris Q Liu
(74) *Attorney, Agent, or Firm* — Oblon, McClelland, Maier & Neustadt, L.L.P.

(57) ABSTRACT

A device fabricates annular pieces by selectively melting powder. The device includes an inner annular wall and an outer annular wall that are concentric and that define an annular powder deposition zone, and a powder dispenser movable in rotation about an axis of the inner and outer annular walls. The powder dispenser includes a wiper extending between the inner annular wall and the outer annular wall and forming an angle with the radial direction of the inner and outer annular walls.

9 Claims, 2 Drawing Sheets

(51) Int. Cl.
  *B29C 64/241*     (2017.01)
  *B29C 64/153*     (2017.01)
  *B33Y 30/00*      (2015.01)
  *B33Y 80/00*      (2015.01)
  *B29C 64/214*     (2017.01)
  *B23K 26/144*     (2014.01)
  *B23K 26/70*      (2014.01)
  *B23K 101/30*     (2006.01)

(52) U.S. Cl.
  CPC ... *B22F 2003/1056* (2013.01); *B23K 2101/30* (2018.08); *Y02P 10/295* (2015.11)

(56) References Cited

U.S. PATENT DOCUMENTS

| | | | |
|---|---|---|---|
| 2008/0006334 A1* | 1/2008 | Davidson | B29C 64/35 137/571 |
| 2008/0042321 A1 | 2/2008 | Russell et al. | |
| 2013/0108726 A1* | 5/2013 | Uckelmann | B29C 67/0007 425/174.4 |
| 2013/0264750 A1 | 10/2013 | Hofacker et al. | |

\* cited by examiner

DEVICE FOR FABRICATING ANNULAR PIECES BY SELECTIVELY MELTING POWDER, THE DEVICE INCLUDING A POWDER WIPER

FIELD OF THE INVENTION

The invention relates to the field of fabricating pieces by selectively melting powder, and in particular to a device for fabricating annular pieces by selectively melting powder. Naturally, the term "annular piece" is used to mean any cylindrical piece that is of circular section, or frustoconical, or a body of revolution, or the equivalent.

BACKGROUND OF THE INVENTION

Before sintering the powder in selective manner, fabricating pieces by selectively melting powder requires a layer of powder to be deposited with thickness that is uniform (i.e. without any local extra thicknesses or shortages). The quality of the piece depends in particular on the quality of the uniformity of the thickness of the powder layer that is to be sintered. This problem is particularly sensitive for pieces of annular shape, in particular when the powder dispenser is rotary and ends its annular path in the same place as where it began it. That gives rise to a (connection) zone where uniformity in the thickness of the powder layer is particularly difficult to achieve. There therefore exists a need in this sense.

OBJECT AND SUMMARY OF THE INVENTION

An embodiment provides a device for fabricating annular pieces by selectively melting powder, the device comprising an inner annular wall and an outer annular wall that are concentric and that define an annular powder deposition zone, and a powder dispenser movable in rotation about the axis of the inner and outer annular walls, the powder dispenser including a wiper extending between the inner annular wall and the outer annular wall and forming an angle with the radial direction of the inner and outer annular walls.

The two annular walls are concentric and present a common axis, with this common axis defining an axial direction (referred to below as "the" axis). It can naturally be understood that a radial direction is a direction perpendicular to the common axis. The azimuth (or circumferential) direction corresponds to the direction describing a ring around the axial direction. The axial, radial, and azimuth directions correspond respectively to the direction defined by the height, by the radius, and by the angle in a cylindrical coordinate system. Furthermore, and unless specified to the contrary, the adjectives "inner" and "outer" are used with reference to a radial direction such that an inner element (i.e. a radially inner element) is closer to the axis than is an outer element (i.e. a radially outer element).

It can be understood that the two annular walls define an annular zone in which a layer of powder is deposited by using the powder dispenser. The wiper extends between the inner and outer walls so as to scrape and remove excess powder in order to make the thickness of the powder layer uniform. Thus, it can be understood that the wiper extends at least from one annular wall to the other annular wall. For example, the wiper extends beyond one wall relative to the annular zone, or even beyond both annular walls relative to the annular zone.

It can also be understood that the powder dispenser is rotary about the common axis of the annular walls (i.e. about the axial direction), i.e. it is movable in translation along the azimuth direction. Furthermore, the wiper forms an angle with the radial direction. It can thus be understood that the wiper is not perpendicular to the azimuth direction.

By means of the angle formed by the wiper relative to the radial direction, surplus powder is removed laterally, e.g. outwards. This makes it possible to spread the powder in uniform manner over the annular zone, and to expel the surplus powder towards the inside or the outside of the annular zone. Thus, when the wiper goes back over where it has already passed, it is ensured that there is no longer any surplus powder, such that the powder layer is not degraded by this second pass. Consequently, the "powder connection" between the beginning and the end of the azimuth stroke of the dispenser is uniform with the remainder of the annular powder layer, which layer thus presents thickness that is uniform over its entire extent.

In some embodiments, the angle between the wiper and the radial direction of the walls is strictly greater than 0° (zero degrees of angle) and less than or equal to 30° (thirty degrees of angle).

In other words, the angle formed by the wiper relative to the radial direction is not zero (i.e. strictly positive) and is at most equal to 30°. Thus, the angle $\alpha$ formed between the wiper and the radial direction satisfies the following relationship:

$$0° < \alpha \leq 30°$$

Such an angle serves to facilitate laterally removing the surplus powder, thereby filling in any indentations formed by local shortages of powder.

In some embodiments, the wiper comprises at least two blades, namely a roughing blade and a finishing blade.

For example, when considered in the travel direction of the dispenser, the roughing blade is located in front of the finishing blade. Thus, the roughing blade passes over the powder layer first, followed by the finishing blade. For example, the distal end in the axial direction of the roughing blade is set back relative to the distal end in the axial direction of the finishing blade by an amount that lies in the range 0.01 mm to 0.04 mm. For example, the roughing blade and the finishing blade are parallel. For example, the roughing blade and the finishing blade present different bending stiffnesses, for example the roughing blade is less stiff than the finishing blade.

The roughing blade serves to remove the powder surplus while the finishing wiper serves to finalise the surface state of the powder layer by properly smoothing the surface of the powder layer and by removing the residual powder surplus. Such a two bladed wiper serves to optimize both removal of the powder surplus and also the uniformity of the thickness of the powder layer.

In some embodiments, the powder dispenser includes a powder dispenser orifice extending between the inner annular wall and the outer annular wall.

It can thus be understood that the powder dispenser orifice (referred to below as the "orifice") covers the annular zone from the inner wall to the outer wall. This makes it possible to deposit the powder in substantially uniform manner in the radial direction over the entire azimuth length of the annular zone, thereby improving the uniformity of the thickness of the powder layer as deposited by the dispenser orifice.

It can be understood that there is an "initial" powder layer that results from powder being deposited by the powder dispenser orifice, and a "final" powder layer that results from passing the wiper over the initial powder layer. Naturally, the more the thickness of the initial layer is uniform, then likewise the more the thickness of the final layer will be uniform.

In some embodiments, the powder dispenser orifice forms an angle with the radial direction of the walls.

This makes it possible to orient a powder deposition front by forming an angle relative to the radial direction, thereby facilitating removal of the powder surplus by the wiper. For example, the angle between the orifice and the radial direction is oriented in the same manner as the angle of the wiper relative to the radial direction. For example, the angle formed by the orifice with the radial direction is the same as the angle formed by the wiper with the radial direction. By way of example, this may be done by mounting the wiper on a wall that defines the orifice.

In some embodiments, the angle between the powder dispenser orifice and the radial direction of the walls is strictly greater than 0° and less than or equal to 30°.

In some embodiments, the section of the powder dispenser orifice increases in the radial direction.

It can thus be understood that the greater the distance from the axis, the greater the section of the distributor orifice. This makes it possible to adjust the quantity of powder that is deposited by the orifice as a function of radius within the annular zone. For example, the section of the orifice is such that the quantity of powder distributed per unit area is the same regardless of the radial position in question. Thus, the quantity of powder distributed per unit area is the same towards the inside and towards the outside of the annular zone. This makes it possible to improve the uniformity of the thickness of the powder layer.

In some embodiments, the opening of the powder dispenser orifice is controlled in such a manner that the powder dispenser orifice can be open, or closed, or else in a position intermediate between the open position and the closed position. This provides good adjustment over the rate at which powder is delivered, in particular as a function of the local requirement for volume and/or of the speed of spreading.

In some embodiments, the powder dispenser includes a powder tank.

Such a powder tank incorporated in the dispenser makes it possible to ensure that powder is fed continuously and constantly, thereby improving the uniformity with which powder is deposited.

In some embodiments, the device includes an inner gutter and an outer gutter for recovering powder, which gutters are arranged outside the annular powder deposition zone, the inner gutter being arranged in the neighborhood of the distal end of the inner annular wall, while the outer gutter is arranged in the neighborhood of the distal end of the outer annular wall.

The term "neighborhood of the distal end" is used to mean that the gutter is at the same axial level as the distal end of the wall in question, or below it while being adjacent to the wall in question. The gutters may be arranged up to 10 mm below the distal ends of the annular walls. For example, in operation, the wiper may come into contact in the axial direction with the distal ends of the inner wall and of the outer wall, thereby removing powder directly into the gutters. Such gutters make it easier to recover and recycle the surplus power as removed in this way. This also makes it possible to control recovery of the surplus powder, and to avoid all or some of the surplus powder inadvertently being found on the layer, thereby degrading its uniformity and the uniformity of its thickness.

In some embodiments, the device includes a powder suction and recycling system configured to suck up the powder recovered in the inner and outer gutters and to convey it to a powder tank.

Naturally, the powder tank may be an auxiliary tank or it may be a main powder supply tank, serving to feed the tank of the dispenser with powder. This makes it possible to recycle the powder, and to re-use it in subsequent steps. The device is thus more economical and can operate for longer.

This also makes it possible to recover in automatic manner the removed surplus powder, thereby minimizing manual interventions and consequently minimizing the risks of erroneous manipulations that might degrade the powder layer. This serves indirectly to improve uniformity and uniformity of thickness of the powder layer.

BRIEF DESCRIPTION OF THE DRAWINGS

The invention and its advantages can be better understood on reading the following detailed description of various embodiments of the invention given as nonlimiting examples. The description makes reference to the accompanying sheets of figures, in which.

DETAILED DESCRIPTION OF EMBODIMENTS

Figure 1:
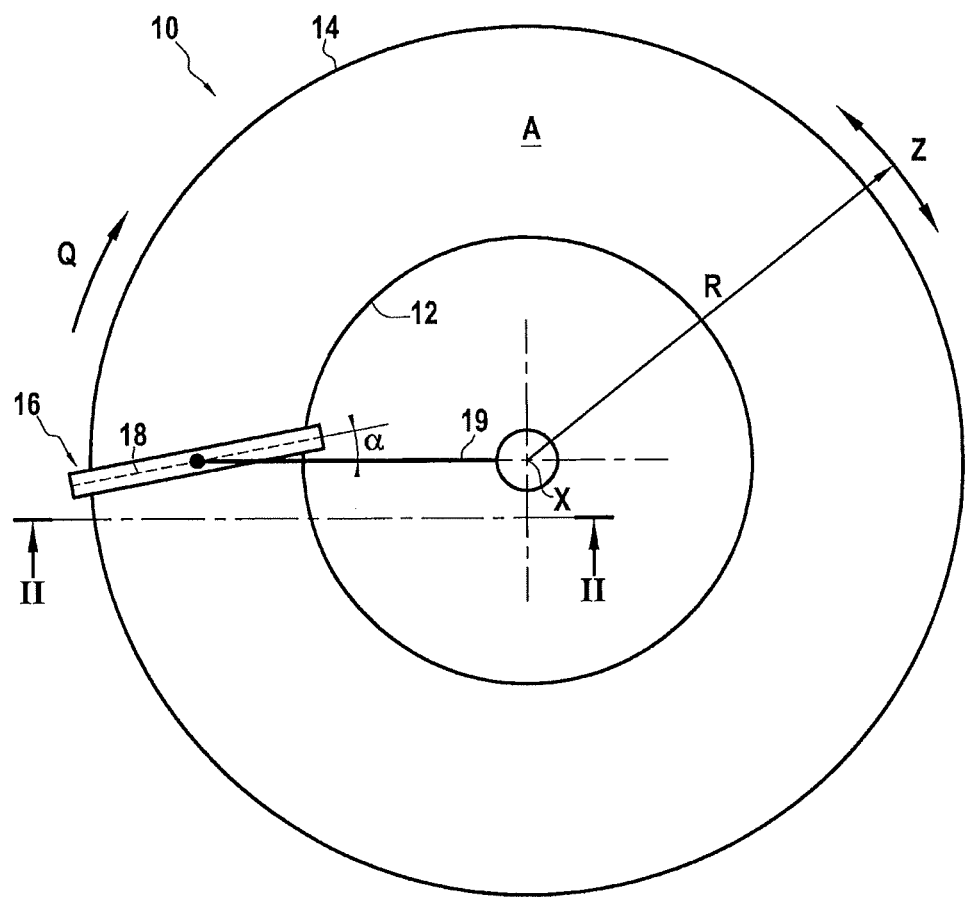
FIG. 1 shows a device for fabricating annular pieces by selective melting of powder, as seen from above.
Figure 2:
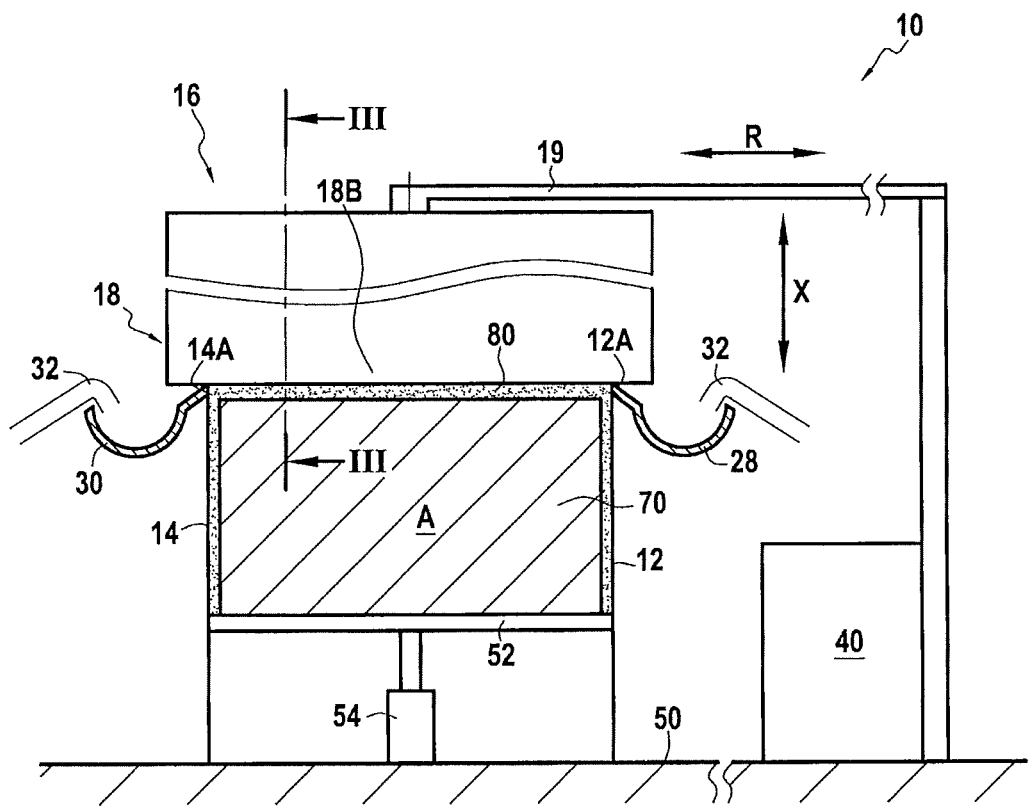
FIG. 2 shows the FIG. 1 device, seen in section on plane II of FIG. 1.

FIGS. 1 and 2 show a device 10 for fabricating annular pieces by selective melting of powder. Naturally, and as a general rule, the powder is a metal powder that is sintered by one or more laser heads or by electron beam(s). There is thus alternation between depositing a layer of powder, and then selectively sintering the layer of powder by means of a laser head or an electron beam. This is known to the person skilled in the art, and is therefore not described in the present disclosure.

The device 10 has an inner annular wall 12 and an outer annular wall 14 defining an annular zone A for depositing powder. The walls 12 and 14 are concentric, having a common axis X defining an axial direction X. The radial and azimuth directions are represented respectively by arrows R and Z. As shown in FIG. 2, the walls 12 and 14 are mounted to be stationary relative to a base 50, and a tray 52 that is mounted on a support 54, that is slidable in the axial direction X, and that forms a bottom, is arranged in the annular zone A. Thus, at the beginning of operations, the tray 52 is positioned so as to be set back a little from the distal ends 12A and 14A of the walls 12 and 14, and a first layer of powder is deposited and then sintered. Thereafter, the support 54 is moved downwards in FIG. 2, in such a manner that the tray 52 moves away from the ends 12A and 14A of the walls 12 and 14, thereby creating a new space for receiving a new layer of powder. Thereafter, a new layer of powder is deposited and then sintered, and the table is moved down again, etc. In FIG. 2, there can be seen an intermediate step while a piece 70 is being fabricated with a layer 80 of powder being deposited. It should be observed that the residual powder (i.e. the non-sintered powder) is held captive between the piece 70 being fabricated and the walls 12 and 14. For clarity of the description, the piece 70 in this example is an annular cylinder, however any other shape, and in particular a complex shape could naturally be envisaged, such as for example a bladed rotor wheel or a set of guide vanes.

Figures 3, 4:
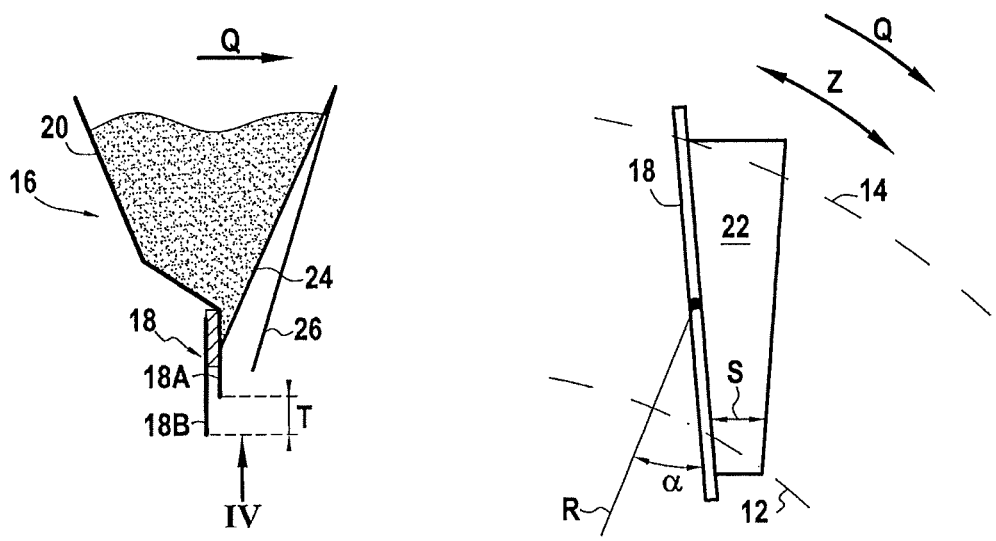
FIG. 3 shows the powder dispenser as seen in section on plane III of FIG. 2.
FIG. 4 shows the powder dispenser seen looking along arrow IV of FIG. 3.

A powder dispenser 16 is movable in rotation about the axis X, and in this example it is mounted at the end of an arm 19. As can be seen in FIG. 3, the dispenser 16 comprises a wiper 18 and a tank 20 of powder.

In FIG. 1, the wiper 18 is drawn as a discontinuous line. The angle α between the wiper 18 and the radial direction R (with the arm 16 extending along the radial direction) is equal to 10° (ten degrees of angle).

In this example, and with reference to FIG. 3, the wiper 18 comprises two parallel blades, namely a roughing blade 18A and a finishing blade 18B. The distal end of the roughing blade 18A is set back relative to the distal end of the finishing blade 18B. In this example, the setback T is equal to 0.02 mm. In general manner, the setback T lies in the range 0.01 mm to 0.04 mm.

The powder tank 20 has a powder dispenser orifice 22. This orifice 22 is shown in FIG. 4 and extends between the inner wall 12 and the outer wall 14, from the inner wall 12 as far as the outer wall 14. In other words, in this example, the orifice 22 presents a first radial end arranged substantially facing the inner wall 12 in the axial direction X, and a second radial end arranged substantially facing the outer wall 14 in the axial direction X. The section S of the orifice 22 increases in the radial direction R. Specifically, in this example, the shape of the orifice is trapezoidal, the small side of the trapezoid being arranged on the inside, while the long side is arranged on the outside.

The wiper 18 is mounted on a wall of the tank 20 in such a manner that the orifice 22 forms the same angle α with the radial direction as does the wiper 18. It should be observed that in the meaning of the present invention, the angle between the wiper 18 and the orifice 22 is measured between the roughing blade 18A (if the wiper has a plurality of blades) and the wall defining the orifice 22 that is adjacent to the wiper 18.

In FIG. 3, the orifice 22 is closed by a closure blade 24, this blade 24 moving into the opening position by bearing against the opening adjustment blade 26. Thus, the closure blade 24 is movable between a closed position shown in FIG. 3 and an open position corresponding substantially to the position of the blade 26.

With reference to FIG. 2, the device 10 is fitted with an internal gutter 28 and with an external gutter 30, these gutters being arranged outside the annular zone A, and being connected to the distal ends 12A and 14A of the walls 12 and 14. These gutters 28 and 30 are not shown in FIG. 1, but they naturally extend over the entire inner periphery of the inner wall 12 and over the entire outer periphery of the outer wall 14. Suction nozzles 32 forming a suction and recycling system are arranged facing the bottoms of the gutters 28 and 30. These nozzles are configured to suck up the powder removed by the wiper 18 from the annular zone A. The powder as sucked up in this way is taken to a main powder tank 40 subsequent re-use. In this example, the nozzles 32 are secured to the arm 19 (coupling not shown) and they are driven in rotation together with the arm 19. In a variant, the gutters are also secured to the arm 19 and driven in rotation together with the arm. Under such circumstances, the gutters naturally do not extend over the entire azimuth lengths of the walls 12 and 14.

In operation, and as shown in FIG. 2, the wiper 18, and more particularly the finishing blade 18B, is in contact in the axial direction X with the distal ends 12A and 14A of the walls 12 and 14. With the dispenser 16 being driven in azimuth Z in the direction Q as shown in FIGS. 1, 3, and 4, the wiper 18 removes surplus powder that is removed into the gutters 28 and 30 and subsequently sucked up and taken to the tank 40. For example, the nozzles 32 suck continuously while the wiper 18 is passing over the powder layer, such that the powder is sucked up as soon as it is removed into the gutters, thereby minimizing the undesirable presence of powder in the neighborhood of the annular zone A.

Furthermore, and as shown in FIG. 4, the powder dispenser orifice extends a little beyond the inner and outer walls 12 and 14. The gutters 28 and 30 also serve to recover and recycle this powder surplus that is deposited outside the annular zone while powder is being dispensed.

Naturally, since the wiper 18 is fastened to the tank 20, powder is removed by the wiper 18 at the same time as powder deposition is taking place. Nevertheless, since the orifice 22 can be closed, it is possible, after the first revolution, to continue the stroke of the wiper 18 while the orifice 22 is closed, e.g. over one fourth of a revolution, in order to ensure proper removal of the powder surplus.

Although the present invention is described with reference to specific embodiments, it is clear that modifications and changes may be made to those embodiments without going beyond the general ambit of the invention as defined by the claims. In particular, individual characteristics of the various embodiments that are illustrated and/or mentioned may be combined in additional embodiments. Consequently, the description and the drawings should be considered in a sense that is illustrative rather than restrictive.

It is also clear that all of the characteristics described with reference to a method may be transposed, singly or in combination, to a device, and conversely all of the characteristics described with reference to a device may be transposed, singly or in combination, to a method.

The invention claimed is:

1. A device for fabricating annular pieces by selectively melting powder, the device comprising:
    an inner annular wall and an outer annular wall that are concentric and that define an annular powder deposition zone, the inner annular wall and the outer annular wall have an axis, and
    a powder dispenser movable in rotation about the axis of the inner and outer annular walls,
    wherein the powder dispenser includes a wiper extending between the inner annular wall and the outer annular wall, the wiper forming an angle with the radial direction of the inner and outer annular wall,
    wherein the powder dispenser includes a powder dispenser orifice extending between the inner annular wall and the outer annular wall, the powder dispenser orifice forming an angle with the radial direction of the inner and outer annular walls, and
    wherein the powder dispenser orifice extends inside of the inner annular wall and outside of the outer annular wall.

2. The device according to claim 1, wherein the angle between the wiper and the radial direction of the walls is strictly greater than 0° and less than or equal to 30°.

3. The device according to claim 1, wherein the wiper comprises at least two blades, namely a roughing blade and a finishing blade.

4. The device according to claim 1, wherein the angle between the powder dispenser orifice and the radial direction of the walls is strictly greater than 0° and less than or equal to 30°.

5. The device according to claim 1, wherein the powder dispenser orifice has a section, and the section of the powder dispenser orifice increases in the radial direction.

6. The device according to claim 1, wherein the powder dispenser includes a powder tank.

7. The device according to claim 1, including an inner gutter and an outer gutter for recovering powder, the inner gutter and the outer gutter being arranged outside of the annular powder deposition zone, the inner gutter being arranged in a neighborhood of the distal end of the inner annular wall, while the outer gutter is arranged in a neighborhood of the distal end of the outer annular wall.

8. The device according to claim 7, including a powder suction and recycling system configured to suck up powder recovered in the inner and outer gutters and to convey the powder recovered to a powder tank.

9. The device according to claim 1, further comprising a tray positioned within distal ends of the inner and outer annular walls, the tray being mounted on a support to be slidable in a direction parallel to the axis of the inner and outer annular walls.

* * * * *